US007740939B2

(12) United States Patent
Harada et al.

(10) Patent No.: US 7,740,939 B2
(45) Date of Patent: Jun. 22, 2010

(54) INSULATING MAGNETIC METAL PARTICLES AND METHOD FOR MANUFACTURING INSULATING MAGNETIC MATERIAL

(75) Inventors: Kouichi Harada, Tokyo (JP); Tomohiro Suetsuna, Kawasaki (JP); Seiichi Suenaga, Yokohama (JP); Maki Yonetsu, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 507 days.

(21) Appl. No.: 11/880,521

(22) Filed: Jul. 23, 2007

(65) Prior Publication Data

US 2008/0029300 A1 Feb. 7, 2008

(30) Foreign Application Priority Data

Aug. 7, 2006 (JP) ............................ 2006-214813

(51) Int. Cl.

*B32B 5/16* (2006.01)
*B28B 1/00* (2006.01)
*B28B 3/00* (2006.01)
*C04B 35/01* (2006.01)
*C04B 35/14* (2006.01)
*C04B 35/26* (2006.01)

(52) U.S. Cl. ........................ 428/403; 264/603; 264/611; 264/681; 428/570

(58) Field of Classification Search ................. 428/403, 428/570; 427/212, 216, 217, 402, 405, 419.2, 427/419.3; 264/603, 611, 681
See application file for complete search history.

(56) References Cited

U.S. PATENT DOCUMENTS

| | | | | | |
|---|---|---|---|---|---|
| 4,601,753 | A | * | 7/1986 | Soileau et al. | 428/404 |
| 5,063,011 | A | * | 11/1991 | Rutz et al. | 264/126 |
| 5,069,972 | A | | 12/1991 | Versic | 428/407 |
| 5,352,522 | A | * | 10/1994 | Kugimiya et al. | 428/403 |
| 6,179,894 | B1 | * | 1/2001 | Gay | 75/230 |
| 6,207,280 | B1 | * | 3/2001 | Atarashi et al. | 428/403 |
| 6,372,348 | B1 | * | 4/2002 | Hanejko et al. | 428/407 |
| 7,285,329 | B2 | * | 10/2007 | Kaneko et al. | 428/403 |
| 7,371,271 | B2 | * | 5/2008 | Igarashi et al. | 75/246 |
| 7,485,366 | B2 | * | 2/2009 | Ma et al. | 428/407 |
| 7,544,417 | B2 | * | 6/2009 | Maeda et al. | 428/403 |
| 2004/0105980 | A1 | | 6/2004 | Sudarsham et al. | 428/404 |
| 2005/0003192 | A1 | * | 1/2005 | Atarashi et al. | 428/403 |

FOREIGN PATENT DOCUMENTS

| | | |
|---|---|---|
| JP | 63-158810 | 7/1988 |
| JP | 4-21739 | 1/1992 |
| JP | 2004-281846 | 10/2004 |
| JP | 2004 390730 | 10/2004 |
| JP | 2006-97123 | 4/2006 |

* cited by examiner

*Primary Examiner*—H. (Holly) T Le
(74) *Attorney, Agent, or Firm*—Ohlandt, Greeley, Ruggiero & Perle, L.L.P.

(57) ABSTRACT

An insulating magnetic metal particle includes a magnetic metal particle containing at least one metal selected from the group consisting of Co, Fe, and Ni and having a diameter of 5 to 500 nm, a first inorganic insulating layer made of an oxide that covers the surface of the magnetic metal particle, and a second inorganic insulating layer made of an oxide that produces a eutectic crystal by reacting together with the first inorganic insulating layer at the time of heating them, the second inorganic insulating layer being coated on the first inorganic insulating layer. A thickness ratio of the second inorganic insulating layer with respect to the first inorganic insulating layer is set so that the first inorganic insulating layer remains on the surface of the magnetic metal particle after producing the eutectic crystal.

19 Claims, 1 Drawing Sheet

INSULATING MAGNETIC METAL PARTICLES AND METHOD FOR MANUFACTURING INSULATING MAGNETIC MATERIAL

CROSS-REFERENCE TO RELATED APPLICATIONS

This application is based upon and claims the benefit of priority from prior Japanese Patent Application No. 2006-214813, filed Aug. 7, 2006, the entire contents of which are incorporated herein by reference.

BACKGROUND OF THE INVENTION

1. Field of the Invention

The present invention relates to insulating magnetic metal particles, and a method for manufacturing an insulating magnetic material.

2. Description of the Related Art

In recent years, downsizing and weight saving of electronic communication equipment are intended with rapid increase of communicatory information. As a result, it is desired to reduce the size and the weight of electronic parts to be loaded on such equipment. In the existing portable communication terminals, most information transmission is conducted by means of transmission and reception of radio signals. A frequency band of radio signals which is applied at present is in a high-frequency region of 100 MHz or higher. For this reason, attention is currently focused on such electronic parts and substrates being effective in the high-frequency region. Furthermore, radio signals in a high-frequency region of a GHz band are used in portable mobile communications and satellite communications.

In order to respond to the radio signals in such a high-frequency region as described above, it is required that an energy loss or a transmission loss is small in electronic parts. For example, in an antenna device indispensable for portable communication terminals, the electromagnetic radiation emitted from the antenna cause a transmission loss in the course of transmission. The transmission loss is consumed as a thermal energy in electronic parts and printed circuit boards, whereby it becomes a cause for generating heat in the electronic parts. As a consequence, the radio signal to be transmitted to the outside is cancelled, so that it is necessary to transmit an excessive high-power radio signal, resulting in a setback for effective utilization of electric power.

On the other hand, respective electronic parts come to be downsized with the increase of demands for downsizing and light weight, whereby space saving is intended. In this respect, however, an antenna device is absolutely imperative for assuring a distance from the electronic parts and the printed circuit boards in order to suppress a transmission loss from the reason as mentioned above. Because of this, it is compelled to include an unnecessary space, and as a result, it is difficult to intend realization of space saving.

From such background as that described above, an antenna device using dielectric ceramics is developed, which makes it possible to achieve space saving as a result of downsizing the antenna device. However, since a transmission loss increases due to a dielectric loss in a dielectric material, transmission and reception sensitivity cannot be obtained so that such an antenna device is applied as an auxiliary antenna device in the actual situation. Thus, there is a limitation in electric power saving.

As an antenna device, there is known one which includes an insulating substrate of a high relative magnetic permeability and which performs transmission and reception without transmitting electromagnetic radiation to electronic parts and printed circuit boards in communication equipment by diverting the electromagnetic radiation that reaches the electronic parts and printed circuit boards from the antenna into the insulating substrate. However, a metal or an alloy is used in a usual high relative magnetic permeability material, so that when the frequency of electromagnetic radiation increases, a transmission loss due to eddy currents becomes remarkable, and hence, it becomes difficult to use for an antenna substrate.

Furthermore, it becomes possible to suppress the transmission loss due to eddy currents by an antenna device provided with a magnetic body of an insulating oxide represented by ferrite as an antenna substrate. However, such an antenna device approaches a resonant frequency at a high frequency of several hundreds of hertz, whereby a transmission loss due to resonance becomes remarkable. For this reason, such an insulating high relative magnetic permeability material as that described hereunder is desired as a material of an antenna substrate. Namely, a transmission loss of the insulating high relative magnetic permeability material is suppressed as much as possible, so that it is possible to use the material for electromagnetic radiation of high frequency.

As to an insulating high relative magnetic permeability material, known is a method for manufacturing a thin film nanogranular material of a high relative magnetic permeability by the use of a thin film technique such as a sputtering method. The thin film nanogranular material has a structure obtained by dispersing magnetic metal particles into an insulator in a high density. However, large-scaled facilities are required for practicing the method. Moreover, since a film formation rate is very slow according to the method, it is difficult to thicken the film. In addition, uniform film quality is hardly obtained, so that the method has little practicability in view of a cost and a yield ratio.

Also known is a method for manufacturing a thin film nanogranular material of a high relative magnetic permeability by mixing/dispersing magnetic metal particles with/into an insulating material. However, when a ratio of the magnetic metal particles increases with respect to the insulating material in the method, the magnetic metal particles agglomerate with each other to decrease the dispersibility, so that the magnetic loss increases.

On the other hand, JP-A 2004-281846 (KOKAI) discloses a method for preparing a thick film nanogranular material of a high relative magnetic permeability. In the method, a hardly reducible metal oxide such as $SiO_2$ is admixed with a magnetic metal oxide consisting of at least one of Fe, Co, or the alloys thereof to obtain a layer. The layer is heated in a reducing atmosphere to obtain a sintered body having a powder or polycrystalline structure, while magnetic metal particles are precipitated in the sintered body to obtain the thick film nanogranular material.

JP-A 2004-290730 (KOKAI) discloses a composite particle having a core-shell structure, for example, a composite particle composed of a core made of iron oxide having 0.5 to 10 μm thickness and a shell made of $SiO_2$ having 20 nm to 0.1 μm thickness.

In JP-A 2006-97123 (KOKAI), there is disclosed, for example, a core shell particle obtained by covering a magnetic metal nucleus of 10 μm or less with a multi-layered inorganic material, or a particle obtained by covering further the core shell particle with a resin.

However, the high relative magnetic permeability magnetic material disclosed in the above-described JP-A 2004-281846 (KOKAI) takes a conformation wherein the magnetic metal particles are precipitated in the sintered body having the powder or polycrystalline structure. Therefore, the size of the magnetic metal particles or the distances among the particles are dependent on eventuality, so that the controllability is low and there is little practicability in view of the yield ratio.

In the above-described JP-A 2004-290730 (KOKAI), for the sake of manufacturing a magnetic film from the resulting core-shell composite particles, the shell is molten as a binder to be incorporated into a single body, so that even the core itself is molten, whereby, for example, the spherical core shape thereof deforms to decrease the magnetic property (relative magnetic permeability).

In JP-A 2006-97123 (KOKAI) described above, the outermost layer must be fused for incorporating the resulting core-shell particles into a single body. In the embodiment and examples, the metal particles in the core part exhibits a lower melting point than that of the outermost layer in the case where the outermost layer is an oxide and a nitride. For this reason, the core magnetic metal particles agglomerate with each other, so that the magnetic loss due to eddy currents becomes remarkable. On one hand, agglomeration of the core magnetic metal particles can be prevented in the case where the outermost layer is a resin. However, it is difficult to form a resin layer to be in a thin state. Besides, since a ratio of the core magnetic metal contained in the incorporated magnetic body is small, it becomes difficult to obtain a high relative magnetic permeability. In addition, it is hard to afford magnetism to the resin itself, whereby it becomes difficult to obtain a magnetic coupling among magnetic metal particles in an insulating magnetic material having magnetic particles incorporated into a single body.

BRIEF SUMMARY OF THE INVENTION

According to a first aspect of the present invention, there is provided an insulating magnetic metal particle, comprising:

a magnetic metal particle containing at least one metal selected from the group consisting of Co, Fe, and Ni and having a diameter of 5 to 500 nm;

a first inorganic insulating layer made of an oxide that covers the surface of the magnetic metal particle; and a second inorganic insulating layer made of an oxide that produces a eutectic crystal by reacting together with the first inorganic insulating layer at the time of heating them, the second inorganic insulating layer being coated on the first inorganic insulating layer, wherein a thickness ratio of the second inorganic insulating layer with respect to the first inorganic insulating layer is set so that the first inorganic insulating layer remains on the surface of the magnetic metal particle after producing the eutectic crystal.

According to a second aspect of the present invention, there is provided a method for manufacturing an insulating magnetic material, comprising:

forming a first inorganic insulating layer made of an oxide on the surface of a magnetic metal particle containing at least one metal selected from the group consisting of Co, Fe, and Ni and having a diameter of 5 to 500 nm;

forming a second inorganic insulating layer made of an oxide that produces a eutectic crystal by reacting together with the first inorganic insulating layer at the time of heating them on the first inorganic insulating layer thereby to produce an insulating magnetic metal particle, wherein a thickness ratio of the first and second inorganic insulating layers is set so that the first inorganic insulating layer remains on the surface of the magnetic metal particle after producing the eutectic crystal;

molding the insulating magnetic metal particles to form a molded body; and heating the molded body to produce the eutectic crystal by reacting between the first and second insulating layers, while the first inorganic insulating layer remains on the surface of the magnetic metal particle.

DETAILED DESCRIPTION OF THE INVENTION

In the following, an insulating magnetic metal particle and a method for manufacturing an insulating magnetic material according to an embodiment of the present invention will be described with reference to the accompanying drawings. In this case, it is to be noted that the drawings are schematically drawn, so that ratios of thicknesses in respective material layers, diameters of magnetic metal particles and the like differ from those of the actual condition. Accordingly, specific thicknesses and dimensions of diameters should be judged with taking the following description into consideration. Furthermore, there are different portions as to a relationship of dimensions or ratios of the particles in the respective drawings from one another as a matter of course.

The insulating magnetic metal particle according to an embodiment has a structure composed of a magnetic metal particle, a first inorganic insulating layer, and a second inorganic insulating layer. The magnetic metal particle contains at least one metal selected from the group consisting of Co, Fe and Ni, and has a diameter of 5 to 500 nm. The first inorganic insulating layer covers the surface of the magnetic metal particle. The second inorganic insulating layer is coated on the first inorganic insulating layer and made of an oxide that produces a eutectic crystal by reacting together with the first inorganic insulating layer at the time of heating. A thickness ratio of the second inorganic insulating layer with respect to the first inorganic insulating layer is set so that the first inorganic insulating layer remains on the surface of the magnetic metal particle after forming the eutectic crystal.

Figure 1:
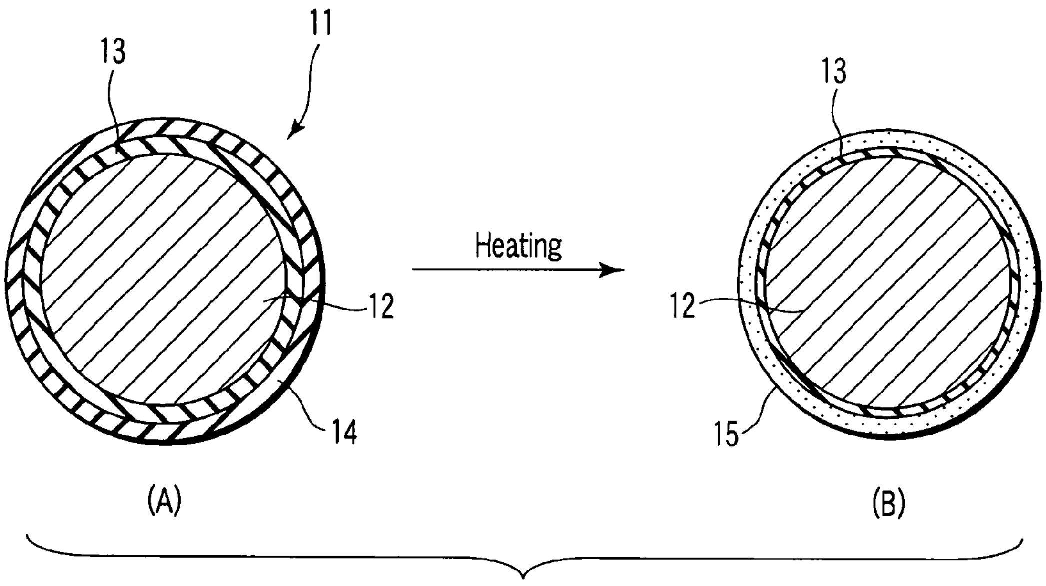
FIG. 1 is a schematic sectional view showing an insulating magnetic particle according to an embodiment, and a state of the insulating magnetic particle after heating the particle.

More specifically, as shown in (A) of FIG. 1, an insulating magnetic particle 11 has a structure in which first and second inorganic insulating layers 13 and 14 are coated in this order on a magnetic metal particle 12 having a diameter of 5 to 500 nm and containing at least one metal selected from the group consisting of Co, Fe, and Ni. The first and second inorganic insulating layers 13 and 14 are prepared from oxides which react with each other by application of heat to produce a eutectic crystal 15 as shown in (B) of FIG. 1. Moreover, the first and second inorganic insulating layers 13 and 14 have a specific thickness ratio, i.e., a thickness ratio set such that the first inorganic insulating layer 13 remains on the surface of the magnetic metal particle 12 after formation of the eutectic crystal 15.

The magnetic metal particle contains at least one metal (soft magnetic metal) selected from Fe, Ni, and Co. Specifically, the magnetic metal particle contains any of Fe particle, Ni particle, Fe—Co particle, Fe—Ni particle, Co—Ni particle, and Fe—Co—Ni particle as the basic component, and permits to contain a nonmagnetic metal such as Al or Si as a second component.

Particularly, it is preferred that the magnetic metal particle has such a composition that it contains a Fe—Co particle exhibiting the highest saturation magnetization as the basic component, and another element such as Ni, Al, and Si is added thereto for affording oxidation resistance to the insulating magnetic particle to be obtained. The resulting insulating magnetic particle having such a magnetic metal particle of Fe—Co can realize a high relative magnetic permeability. It is desirable that Al or Si being an additional metal is contained in a ratio of 50 atomic % or less, and that the additional metal is solid-solved in the soft magnetic metal (or alloy). Example of such a solid solution alloy system include Fe—Al, Fe—Si, Co—Si, Ni—Si, Fe—Co—Al, Fe—Co—Si, Fe—Ni—Al, Fe—Ni—Si, Co—Ni—Si, Fe—Co—Ni—Al, and Fe—Co—Ni—Si. An amount of an additional metal to be solid-solved is desirably small in order that the saturation magnetization of a particle is made to be high as much as possible, while it is desirably large in order to obtain good adhesion with the first inorganic insulating layer to be coated on the particle. In other words, an amount of such an additional metal to be solid-solved is determined by a balance between the saturation magnetization and the adhesion with respect to the first inorganic insulating layer, so that the most preferable is in that the amount is within a range of 5 to 10 atomic %.

The magnetic metal particle permits to contain a minute amount of another component such as Mn or Cu in order to improve the high-frequency property such as relative magnetic permeability.

The magnetic metal particle is not necessarily in a right sphere shape, but it exhibits preferably shape anisotropy such as a spheroidal, flattened, and needle-like shape.

The upper limit of a diameter is determined to be 500 nm, because when a frequency increases to, for example, 1 GHz or more, influences of skin effect increase in a magnetic material (magnetic parts). In the case where the magnetic material is applied to, for example, electronic communication equipment such as an antenna substrate, the upper limit of the diameter is preferably to be within a range of 10 to 100 nm. An excessive diameter results in generation of eddy current loss in the case where the magnetic material is used for electronic communication equipment and the like. Accordingly, the upper limit of the diameter is preferably determined to be 100 nm or less in order to assure the property of an insulating magnetic material. Furthermore, it becomes energetically stable to take a multiple magnetic domain structure rather than a single magnetic domain structure in the case where the diameter is large, but the high-frequency property of a relative magnetic permeability in the multiple magnetic domain structure decreases than that of the single magnetic domain structure. Thus, it is preferred that soft magnetic metal particles or soft magnetic metal alloy particles are allowed to be present as single magnetic domain particles in the case where an insulating magnetic material is used for high-frequency magnetic parts such as an antenna device. Since a diameter limitation for maintaining a single magnetic domain structure is around 50 nm or less, the diameter is preferably determined to be 50 nm or less. When the diameter is less than 5 nm, on the other hand, super paramagnetism may appear, whereby a saturation magnetic flux density decreases. When such a behavior of magnetic metal particles is taken into consideration, it is preferred that a magnetic metal particle has a diameter of 10 to 100 nm, and particularly 10 to 50 nm.

It is preferable that the first and second inorganic insulating layers each have an insulation resistivity of $1\times10^2$ Ω·cm or higher, and more preferable is $1\times10^8$ Ω·cm or higher.

The first inorganic insulating layer is made of an oxide containing at least one selected from the group consisting of, for example, $CeO_2$, CoO, $Cr_2O_3$, MgO, $Al_2O_3$, $SnO_2$, $NiO_2$, GaO, $GeO_2$, $Li_2O$, $Y_2O_3$, $HfO_2$, $La_2O_3$, ZnO, $ZrO_2$, $WO_3$, $TiO_2$, $Sc_2O_3$, BaO, $Eu_2O_3$, $SiO_2$, $Cs_2O$, $MoO_3$, $Nb_2O_5$, $TeO_2$, $Bi_2O_3$, copper oxides, and iron oxides. Among these oxides, $SiO_2$, MgO, and $Al_2O_3$ are preferred.

The second inorganic insulating layer is made of an oxide different from that of the first inorganic insulating layer and containing at least one selected from the group consisting of, for example, $B_2O_3$, $Bi_2O_3$, PbO, $V_2O_5$, $TeO_2$, $Na_2O$, $K_2O$, and $MoO_3$.

In the first and second inorganic insulating layers made of the respective oxides, it is desirable that the second inorganic insulating layer has a lower melting point than that of the first inorganic insulating layer by 200° C. or more, and more preferably by 500° C. or more.

Assume that the first inorganic insulating layer is made of an oxide (A), while the second inorganic insulating layer is made of another oxide (B). Examples of specific combinations (B-A) for producing mutually a eutectic crystal from these oxides include $B_2O_3$—$Al_2O_3$, $B_2O_3$—$GeO_2$, $B_2O_3$—$SiO_2$, $B_2O_3$—$WO_3$, $B_2O_3$—$Cr_2O_3$, $B_2O_3$—$MoO_3$, $B_2O_3$—$Nb_2O_5$, $B_2O_3$—$Li_2O_3$, $B_2O_3$—BaO, $B_2O_3$—ZnO, $B_2O_3$—$La_2O_3$, $B_2O_3$—CoO, $B_2O_3$—$Cs_2O$, $B_2O_3$—$K_2O$, $K_2O$—$GeO_2$, $K_2O$—$SiO_2$, $K_2O$—$WO_3$, $K_2O$—$MoO_3$, $K_2O$—$Nb_2O_5$, $Na_2O$—$GeO_2$, $Na_2O$—$SiO_2$, $Na_2O$—$WO_3$, $Na_2O$—MoO, $Na_2O$—$Nb_2O_5$, $MoO_3$—$Cs_2O$, $MoO_3$—$Li_2O$, $MoO_3$—$WO_3$, $Cs_2O$—$SiO_2$, and $Cs_2O$—$Nb_2O_5$. Among these combinations, the B-A is particularly preferably $B_2O_3$—$SiO_2$.

An average thickness of the first inorganic insulating layer is preferably 1 to 10 nm irrespective of the diameter of the magnetic metal particle. The undermentioned insulating magnetic material manufactured from an insulating magnetic metal provided with the first inorganic insulating layer having such an average thickness maintains high resistance. In addition, a ratio of volume percent of the magnetic metal particle with respect to the total insulating magnetic material is improved, so that higher relative magnetic permeability is obtained. In order to increase a saturation magnetic flux density, the optimum an average thickness of the first inorganic insulating layer is 1 to 5 nm.

The second inorganic insulating layer has preferably an average thickness of 1 to 5 nm.

Average thicknesses of the first and second inorganic insulating layers were determined based on TEM observation. Each of thicknesses of layers on one Fe particle is measured at ten or more points in such a manner that they are in an equal condition as much as possible, the resulting maximum thickness and the minimum thickness are excluded, and an average value is determined from the other thicknesses. The same measurement for thickness and the same calculation of an average value were made on five or more particles, whereby the average value of thicknesses was determined.

A thickness ratio of the first and second inorganic insulating layers is set as described above such that the first inorganic insulating layer remains on the surface of the magnetic metal particle after forming a eutectic crystal. Where each of thicknesses of the first and second inorganic insulating layers based on the thickness ratio is an average thickness. The thickness ratio is determined specifically with taking a composition of the eutectic crystal produced between the oxides in these insulating layers at the time of heating into consideration. Namely, examples of the composition of the eutectic crystals produced at the time of heating between oxides which are used as the first and second inorganic insulating layers, include the following compositions, i.e., a composition 1) in which a larger amount of an oxide is contained in the first inorganic insulating layer than that of the second inorganic insulating layer, a composition 2) in which an amount of an oxide in the first inorganic insulating layer is contained equivalently to that of another oxide in the second inorganic insulating layer, and a composition 3) in which a larger amount of an oxide is contained in the second inorganic insulating layer than that of the first inorganic insulating layer contrary to the composition 1). In order to allow the first inorganic insulating layer to be left on the surface of the magnetic metal particle after forming a eutectic crystal in case of the compositions 1) and 2), an average thickness t1 of the first inorganic insulating layer is made to be thicker than an average thickness t2 of the second inorganic insulating layer. In other words, a thickness ratio t2/t1 of the second inorganic insulating layer with respect to the first inorganic insulating layer is made to decrease. In case of the composition 3), it is possible to allow the first inorganic insulating layer to be left on the surface of the magnetic metal particle after forming a eutectic crystal, even when the first inorganic insulating layer is made to be thinner than the second inorganic insulating layer. In other words, a thickness ratio t2/t1 of the second inorganic insulating layer with respect to the first inorganic insulating layer is made to increase. The thickness ratio t2/t1 is preferably, for example, 0.1 to 2.

Specifically, there are the following cases:

in a case where the B-A is $Na_2O—SiO_2$ and a eutectic crystal consisting of $(Na_2Si_2O_5)_{0.279}(SiO_2)_{0.721}$ is produced, a ratio of t2/t1 is 0.7 or less;

in a case where the B-A is $B_2O_3$—ZnO and a eutectic crystal consisting of $(B_2O_3)_{0.343}(ZnO)_{0.657}$ is produced, a ratio of t2/t1 is 0.8 or less;

in a case where the B-A is $B_2O_3$—K2O and a eutectic crystal consisting of $(B_2O_3)_{0.623}(K_2O)_{0.377}$ is produced, a ratio of t2/t1 is 1 or less;

in a case where the B-A is $B_2O_3—SiO_2$ and a eutectic crystal consisting of $(B_2O_3)_{0.877}(SiO_2)_{0.123}$ is produced, a ratio of t2/t1 is 1.2 or less;

in a case where the B-A is $Cs_2O—SiO_2$ and a eutectic crystal consisting of $(Cs_2O)_{0.131}(SiO_2)_{0.869}$ is produced, a ratio of t2/t1 is 1.3 or less; and in a case where the B-A is $MoO_3—Li_2O$ and a eutectic crystal consisting of $(MoO_3)_{0.476}(Li_2MoO_4)_{0.524}$ is produced, a ratio of t2/t1 is 1.4 or less.

It is preferred that a crystal orientation of the magnetic metal particle in the insulating magnetic metal particle according to the embodiment is aligned with the axis of easy magnetization, and that the insulating magnetic metal particle of the embodiment exhibits shape anisotropy from the viewpoint of improving the magnetic property of the undermentioned insulating magnetic material manufactured by using the insulating magnetic metal particle as the starting material.

The insulating magnetic metal particle according to the embodiment may be manufactured by, for example, the following method.

First, a magnetic metal particle containing at least one metal selected from the group consisting of Co, Fe, and Ni and having a diameter of 5 to 500 nm is dispersed into a solution of alkoxides or hydroxide salts, sulfates, nitrates, carbonates, and carboxylates of a metal element for forming an insulating oxide such as Si, Al or Mg, whereby the surface of the magnetic metal particle is covered with a salt or the like contained in the solution. Subsequently, the covered magnetic metal particle taken out from the solution is heated to oxidatively decompose the salt or the like on the surface of the magnetic metal particle thereby to form a first inorganic insulating layer. Then, the magnetic metal particle covered with the first inorganic insulating layer is dispersed into a solution of alkoxides or hydroxide salts, sulfates, nitrates, carbonates, and carboxylates of a metal element for forming an insulating oxide such as B or Mo, whereby the surface of the first inorganic insulating layer is covered with a salt or the like contained in the solution. Thereafter, the covered magnetic metal particle taken out from the solution is heated to oxidatively decompose the salt or the like on the surface of the first inorganic insulating layer thereby to form a second inorganic insulating layer. Consequently, the insulating magnetic metal particle having a structure shown, for example, in (A) of FIG. 1 is manufactured.

Next, a method for manufacturing the insulating magnetic material according to the embodiment will be described with reference to FIG. 2.

Figure 2:
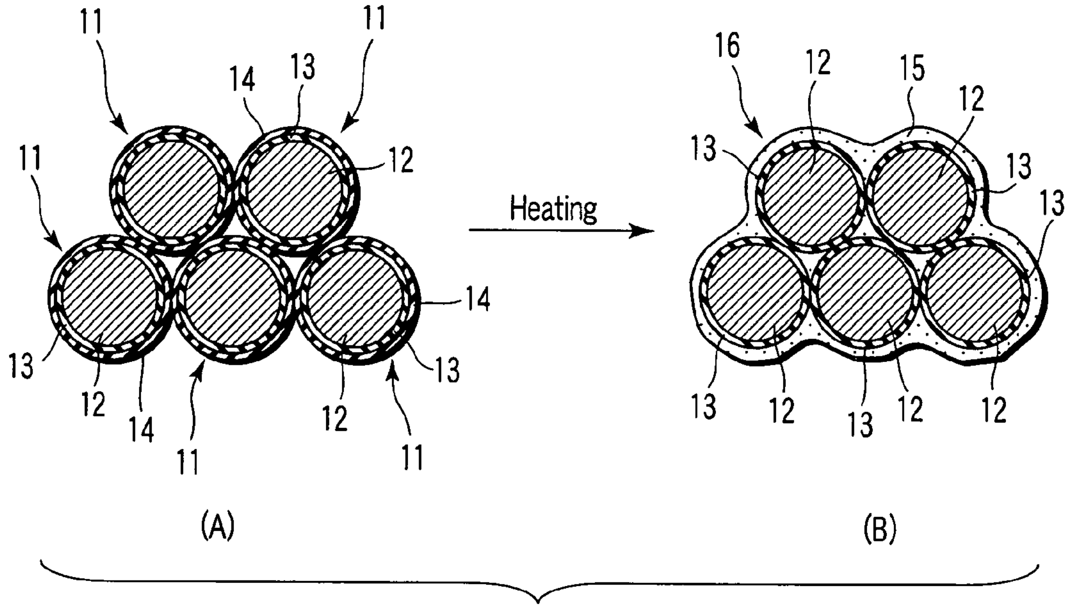
FIG. 2 is schematic sectional view showing a process of manufacturing the insulating magnetic material according to the embodiment.

As shown in (A) of FIG. 2, a plurality of the insulating magnetic metal particles 11 are prepared, and these insulating magnetic metal particles 11 are sheet-molded in a desired thickness. Subsequently, the resulting sheet is heated at a temperature at which a eutectic crystal is generated by reacting between the first and second inorganic insulating layers 13 and 14. In this case, as shown in (B) of FIG. 2, a eutectic crystal 15 is generated by reacting between the first and second inorganic insulating layers. At the same time, the inorganic insulating layer 13 is allowed to remain, thereby covering the magnetic metal particle 12 therewith. As the result, the magnetic metal particle 12 covered with the remaining first inorganic insulating layer 13 is integrated mutually with the eutectic crystal 15 to manufacture an insulating magnetic material 16.

It is preferred that an average thickness of the first inorganic insulating layer to be left on the magnetic metal particle is 1 to 5 nm in the case where an average thickness of the first inorganic insulating layer is 1 to 10 nm and that of the second inorganic insulating layer is 1 to 5 nm, respectively.

According to the method of the embodiment, the sheet molded is heated to produce a eutectic crystal by reacting between the first and second inorganic insulating layers, and the magnetic metal particles covered with the remaining first inorganic insulating layer are dispersed into an insulating matrix made of the eutectic crystal. Accordingly, the shape of the magnetic metal particle (for example, a spherical shape) can be maintained in a state of the insulating magnetic metal particles being the starting material. In addition, a dispersion density of the magnetic metal particles into the inorganic insulating layer consisting of the first insulating layer and the eutectic crystal is improved, which enables the volume percent (Vf) to be improved. As a result, an insulating magnetic material having a high resistance and a high relative magnetic permeability can be obtained.

In the manufacturing of the insulating magnetic material according to the embodiment, insulating magnetic metal particles in which the crystal orientation of a magnetic metal particle is aligned with the axis of easy magnetization are used to be sheet-molded in a magnetic field, so that it becomes possible to align insulating magnetic particles along the target orientation. Thereafter, the molded body is heated to produce a eutectic crystal by reacting between the first and second inorganic insulating layers, and the eutectic crystal is integrated with the magnetic metal particles, whereby it becomes possible to manufacture the insulating magnetic material having more excellent magnetic property.

In the manufacturing of the insulating magnetic material according to the embodiment, insulating magnetic metal particles each having shape anisotropy are used to be sheet-molded in a magnetic field, the sheet molded is heated to produce a eutectic crystal by reacting between the first and second inorganic insulating layers. Then, the eutectic crystal is integrated with the magnetic metal particles, whereby it becomes possible to manufacture the insulating magnetic material having magnetic anisotropy.

The insulating magnetic material manufactured in accordance with the method of the embodiment is integrated the magnetic metal particles covered with the remaining first inorganic insulating layer with a eutectic crystal which is produced by reacting between the first and second inorganic insulating layers. Therefore, it has such a structure that the magnetic metal particles covered with the remaining first inorganic insulating layer are dispersed into an insulating matrix made of the eutectic crystal. It is preferred that the magnetic metal particles covered with the remaining first inorganic insulating layer are dispersed into the matrix with intervals of 0 to 10 nm. The insulating magnetic material having the magnetic metal particles covered with the first inorganic insulating layer in such a dispersion condition maintains a high resistance, and a volume percent of the magnetic metal particles increases further, whereby it becomes possible to improve the saturation magnetic flux density.

In the manufacturing of the insulating magnetic material according to the embodiment, it is permitted to add a compound (for example, oxides, alkoxides, hydroxide salts, sulfates, nitrates, carbonates, or carboxylates) containing at least one element selected from Fe, Co, and Ni at the time of molding the insulating magnetic metal particles. The compound is solved in a eutectic crystal produced by heating. Examples of the applicable oxides being the compounds to be added include FeO, $Fe_2O_3$, $Fe_3O_4$, NiO, CoO, $Co_2O_3$, $FeAl_2O_4$, $CoAl_2O_4$, and $FeAlO_3$. When such compounds containing at least one element selected from Fe, Co and Ni are added, an oxide such as iron oxide for increasing a magnetic coupling of magnetic metal particles intervenes among the magnetic metal particles covered with the first inorganic insulating layer. Accordingly, it becomes possible to manufacture an insulating magnetic material having more excellent magnetic property.

In the embodiment described above, the insulating magnetic material manufactured from insulating magnetic metal particles as the starting material exhibits the excellent property even in a high-frequency area of from 100 MHz to several GHz. The insulating magnetic material having such a property is useful for high-frequency magnetic parts used in a high-frequency area of 100 MHz, and further 1 GHz or more. Examples of the high-frequency magnetic parts include a substrate for antenna, a magnetic core for transformer, a magnetic head core, an inductor, a choke coil, a filter, and an electromagnetic radiation absorber. For example, when the insulating magnetic material is applied to an antenna substrate of an antenna device, it is preferred that a thick film of the insulating magnetic material is laminated alternately with a nonmagnetic insulating thick film. Specifically, a thick film of the insulating magnetic material may be alternately laminated with a SiO—$B_2O_3$-based glass thick film in a repeated manner. The antenna substrate having such a structure can suppress a decrease in apparent relative magnetic permeability due to influences of an antimagnetic field, whereby improvements in antenna characteristics can be achieved.

In the following, examples of the present invention will be described.

Example 1-1

Fe particles having a particle size distribution of 20 to 70 nm were immersed into a tetraethoxysilane [$Si(OC_2H_5)_4$] solution to disperse them, thereby covering the surfaces of the Fe particles were covered with a silicide, and the Fe particles were sintered at 400° C. after drying the particles to form a first inorganic insulating layer made of $SiO_2$ and having an average thickness of 4 nm. Subsequently, the Fe particles covered with the first inorganic insulating layer were immersed into a triethylborate [$B(OC_2H_5)_3$] solution to disperse them, thereby covering the surface of the first inorganic insulating layer with a boron compound, and the Fe particles covered with the boron compound were sintered at 300° C. after drying the particles to form a second inorganic insulating layer made of $B_2O_3$ and having an average thickness of 4 nm. Thus, insulating magnetic metal particles having the Fe particles covered with the first and second inorganic insulating layers were fabricated.

Particle diameters of the magnetic metal particles (Fe particles) were determined based on SEM observation, wherein the diameter corresponds to an average value of the maximum diameter and the minimum diameter. In SEM photograph, three or more lines each of which is 1 μm line were drawn in a random order in a unit area of 1 μm×1 μm, and the magnetic metal particles on these lines were measured to determine a width of the particle size distribution.

Furthermore, average thicknesses of the first and second inorganic insulating layers were determined based on TEM observation. Each of thicknesses of layers on one Fe particle is measured at ten or more points in such a manner that they are in an equal condition as much as possible, the resulting maximum thickness and the minimum thickness are excluded, and an average value is determined from the other thicknesses. The same measurement for thickness and the same calculation of an average value were made on five or more particles, whereby the average value of thicknesses was determined.

These manners for measuring diameters of magnetic metal particles as well as for measuring average thicknesses of the first and second inorganic insulating layers are the same as in the following examples and comparative examples.

Then, the above-described insulating magnetic metal particles were blended for thirty minutes under the condition of 60 rpm by the use of a ball mill. After the resulting blended particles were washed and dried, they were subjected to ultrasonic dispersion in acetone, and the dispersion was centrifuged, whereby the insulating magnetic metal particles were arrayed at a high density in the acetone. The acetone was separated such that the arrayed insulating magnetic particles were not broken, and the remaining acetone was dried further. After drying, the insulating magnetic metal particles were subjected to press molding under a pressure of 1000 kg/cm$^2$ to fabricate a molded body made of the insulating magnetic metal particles and having a thickness of about 400 μm.

Then, the resulting molded body was introduced into an Ar atmospheric furnace, and heated at 500° C. to manufacture an insulating magnetic material with a plate shape.

Example 1-2

An insulating magnetic material was manufactured in the same manner as in Example 1-1 except that the same Fe particles covered with the first inorganic insulating layer as that of Example 1-1 were immersed into a tri-(tertiary amiloxy) bismuth solution to disperse them, thereby covering the surface of the first inorganic insulating layer with a bismuth compound, and the covered particles were sintered at 400° C. after drying the particles, whereby a second inorganic insulating layer made of $Bi_2O_3$ and having an average thickness of 5 nm was formed to fabricate insulating magnetic metal particles being Fe particles covered with the first and second inorganic insulating layers.

Example 1-3

An insulating magnetic material was manufactured in the same manner as in Example 1-1 except that the same Fe particles covered with the first inorganic insulating layer as that of Example 1-1 were immersed into a dis-(dipivaloyl methanate) lead solution to disperse them, thereby covering the surface of the first inorganic insulating layer with a lead compound, and the covered particles were heated at 400° C. after drying the particles, whereby a second inorganic insulating layer made of PbO and having an average thickness of 4 nm was formed to fabricate insulating magnetic metal particles being Fe particles covered with the first and second inorganic insulating layers.

Example 1-4

An insulating magnetic material was manufactured in the same manner as in Example 1-1 except that the same Fe particles covered with the first inorganic insulating layer as that of Example 1-1 were immersed into a vanadium hydroxide [$V(OH)_3$] solution to disperse them, thereby covering the surface of the first inorganic insulating layer with a vanadium compound, and the covered particles were sintered at 400° C. after drying the particles, whereby a second inorganic insulating layer made of $V_2O_5$ and having an average thickness of 5 nm was formed to fabricate insulating magnetic metal particles being Fe particles covered with the first and second inorganic insulating layers.

Examples 2-1 to 2-4

Four types of insulating magnetic materials were manufactured in the same manners as in Examples 1-1 to 1-4, respectively, except that Co particles having a particle size distribution of 20 to 70 nm were used as magnetic particles in place of the Fe particles.

Examples 3-1 to 3-4

Four types of insulating magnetic materials were manufactured in the same manners as in Examples 1-1 to 1-4, respectively, except that 5% by weight of FeO was added in case of blending the insulating magnetic particles.

Example 4

An insulating magnetic material was manufactured in the same manner as in Example 1-1 except that the same Fe particles as those of Example 1-1 were used, and first and second inorganic insulating layers were formed on the Fe particles to fabricate insulating magnetic metal particles in accordance with the following manner.

The Fe particles were immersed into an aqueous aluminum nitrate solution, ammonia was dropped while agitating the mixture to coat the surfaces of the Fe particles with aluminum hydroxide, and then, the coated Fe particles were sintered at 400° C. to form a first inorganic insulating layer made of $Al_2O_3$ and having an average thickness of 5 nm. Subsequently, the Fe particles covered with the first inorganic insulating layer were treated in the same manner as in Example 1-1 to form a second inorganic insulating layer made of $B_2O_3$ and having an average thickness of 4 nm, whereby insulating magnetic metal particles being the Fe particles covered with the first and second inorganic layers were fabricated.

Example 5

An insulating magnetic material was manufactured in the same manner as in Example 1-1 except that a first inorganic insulating layer made of $SiO_2$ and having an average thickness of 3.5 nm was formed on the same Fe particles as those of Example 1-1, and 5% by weight of FeO was added in case of blending the insulating magnetic metal particles.

Example 6

An insulating magnetic material was manufactured in the same manner as in Example 1-1 except that a first inorganic insulating layer made of $SiO_2$ and having an average thickness of 3 nm was formed on the same Fe particles as those of Example 1-1, a second inorganic insulating layer made of $B_2O_3$ and having an average thickness of 4 nm was formed on the first inorganic insulating layer, and 5% by weight of FeO was added in case of blending the insulating magnetic metal particles.

Example 7

An insulating magnetic material was manufactured in the same manner as in Example 1-1 except that a first inorganic insulating layer made of $SiO_2$ and having an average thickness of 3 nm was formed on the same Co particles as those of Example 2-1, a second inorganic insulating layer made of $B_2O_3$ and having an average thickness of 4 nm was formed on the first inorganic insulating layer, and 5% by weight of FeO was added as well as a magnetic field of fifty kilogauss was applied in case of press molding the insulating magnetic metal particles.

Comparative Example 1

An insulating magnetic material was manufactured in the same manner as in Example 1-1 except that the same Fe particles as those of Example 1-1, the Fe particles being covered with only a first inorganic insulating layer made of $SiO_2$ and having an average thickness of 4 nm, were used as insulating magnetic metal particles.

Comparative Example 2

An insulating magnetic material was manufactured in the same manner as in Example 1-1 except that the same Fe particles as those of Example 1-1, the Fe particles being covered with only a first inorganic insulating layer made of $SiO_2$ and having 4 nm average thickness, were used as insulating magnetic metal particles, and 5% by weight of FeO was added in case of blending the insulating magnetic metal particles.

Comparative Example 3

5% by weight of FeO was added to Fe particles having the same diameter distribution as that of Example 1-1, and the resulting mixture was blended for thirty minutes under the condition of 60 rpm by the use of a ball mill. After the mixture was washed and dried, it was subjected to ultrasonic dispersion in acetone, and the dispersion was centrifuged, whereby the above-described Fe particles were arrayed at a high density in acetone with the coexistence of FeO. The acetone was separated such that the arrayed Fe particles were not broken, and the remaining acetone was dried further. After drying, the Fe particles were subjected to press molding under a pressure of 1000 kg/cm$^2$ to fabricate a molded body made of insulating band of the resulting insulating magnetic materials of Examples 1-1 to 1-4, 2-1 to 2-4, 3-1 to 3-4, and 4-7 and comparative examples 1 to 3 was determined. The results thereof are shown in the following tables 1 and 2.

TABLE 1

| | Magnetic metal particle | | First inorganic insulating layer | | Second inorganic insulating layer | | | | Insulating magnetic material | |
|---|---|---|---|---|---|---|---|---|---|---|
| | Type | Particle diameter (nm) | Type | Average thickness (nm) | Type | Average thickness (nm) | Additive | Application of magnetic field in case of molding | Average thickness of remaining first inorganic insulating layer (nm) | Relative magnetic permeability |
| Example 1-1 | Fe | 20-70 | $SiO_2$ | 4 | $B_2O_3$ | 4 | — | No | 4 | 60 |
| Example 1-2 | Fe | 20-70 | $SiO_2$ | 4 | $Bi_2O_3$ | 5 | — | No | 3.9 | 60 |
| Example 1-3 | Fe | 20-70 | $SiO_2$ | 4 | PbO | 4 | — | No | 3.1 | 60 |
| Example 1-4 | Fe | 20-70 | $SiO_2$ | 4 | $V_2O_5$ | 5 | — | No | 4 | 60 |
| Example 2-1 | Co | 20-70 | $SiO_2$ | 4 | $B_2O_3$ | 4 | — | No | 4 | 50 |
| Example 2-2 | Co | 20-70 | $SiO_2$ | 4 | $Bi_2O_3$ | 5 | — | No | 3.9 | 50 |
| Example 2-3 | Co | 20-70 | $SiO_2$ | 4 | PbO | 4 | — | No | 3.1 | 50 |
| Example 2-4 | Co | 20-70 | $SiO_2$ | 4 | $V_2O_5$ | 5 | — | No | 4 | 50 |
| Example 3-1 | Fe | 20-70 | $SiO_2$ | 4 | $B_2O_3$ | 4 | FeO | No | 4 | 70 |
| Example 3-2 | Fe | 20-70 | $SiO_2$ | 4 | $Bi_2O_3$ | 5 | FeO | No | 3.9 | 70 |
| Example 3-3 | Fe | 20-70 | $SiO_2$ | 4 | PbO | 4 | FeO | No | 3.1 | 70 |
| Example 3-4 | Fe | 20-70 | $SiO_2$ | 4 | $V_2O_5$ | 5 | FeO | No | 4 | 70 |

TABLE 2

| | Magnetic metal particle | | First inorganic insulating layer | | Second inorganic insulating layer | | | | Insulating magnetic material | |
|---|---|---|---|---|---|---|---|---|---|---|
| | Type | Particle diameter (nm) | Type | Average thickness (nm) | Type | Average thickness (nm) | Additive | Application of magnetic field in case of molding | Average thickness of remaining first inorganic insulating layer (nm) | Relative magnetic permeability |
| Example 4 | Fe | 20-70 | $Al_2O_3$ | 4 | $B_2O_3$ | 4 | — | No | 3.9 | 60 |
| Example 5 | Fe | 20-70 | $SiO_2$ | 3.5 | $B_2O_3$ | 4 | FeO | No | 3.5 | 65 |
| Example 6 | Fe | 20-70 | $SiO_2$ | 3 | $B_2O_3$ | 4 | FeO | No | 3 | 75 |
| Example 7 | Co | 20-70 | $SiO_2$ | 3 | $B_2O_3$ | 4 | FeO | Yes | 3 | 80 |
| Comparative Example 1 | Fe | 20-70 | $SiO_2$ | 4 | — | — | — | No | — | 1 |
| Comparative Example 2 | Fe | 20-70 | $SiO_2$ | 4 | — | — | FeO | No | — | 1 |
| Comparative Example 3 | Fe | 20-70 | — | — | — | — | FeO | No | — | 1 |

magnetic metal particles and having a thickness of about 400 μm. The molded body was introduced into an Ar atmospheric furnace and heated at 500° C. to manufacture an insulating magnetic material with a plate shape.

In the examples 1-1 to 1-4, 2-1 to 2-4, 3-1 to 3-4, and 4-7, the average thicknesses of the first inorganic insulating layers remaining on the surfaces of the magnetic metal particles after heating the molded bodies and after forming the eutectic crystals of the first and second inorganic insulating layers were determined in accordance with the same measuring manner as that of the average thicknesses of the first and second inorganic insulating layers as mentioned above. Moreover, each relative magnetic permeability in a 1 GHz As is apparent from Tables 1 and 2, it has been found that the insulating magnetic materials according to the examples exhibit a high relative magnetic permeability of 50 to 80 in 1 GHz, i.e., these materials have high-frequency characteristics of the practical level. Note that the relative magnetic permeability exhibits substantially the same value as that of the above case even in 100 MHz. Such excellent high-frequency characteristics of the insulating magnetic materials according to the examples are due to the facts that the magnetic metal particle has a diameter of around 20 to 70 nm average diameter which forms easily a single magnetic domain, that the magnetic metal particle is covered with a stable first inorganic metal particle such as $SiO_2$, and that the first inorganic insulating layer is covered with a eutectic crystal produced from the first inorganic insulating layer and the second inorganic insulating layer, for example, a $SiO_2$—$B_2O_3$ eutectic crystal.

On the other hand, it has been found that the relative magnetic permeability becomes substantially 1 in Comparative Examples 1 to 3 in which the value exceeds a resonance frequency, so that the resulting insulating magnetic materials are not practically applied. This is due to such a fact that since the first inorganic insulating layer is not covered with the second inorganic insulating layer in Comparative Examples 1 and 2, magnetic metal particles such as Fe particles are separated and agglomerated when the first inorganic insulating layer is fused. Hence, a resistance of the material decreases, and the diameter increases, so that the magnetic loss due to eddy currents increases. This is further due to such a fact that magnetic metal particles such as Fe particles are not covered with an inorganic insulating layer in Comparative Example 3, and a configuration is made such that slight FeO is dispersed among the magnetic metal particles, so that the magnetic metal particles are in contact with each other in case of molding them, whereby the metals are sintered by means of a heat treatment through separation and agglomeration.

As mentioned above, it has been found that the insulating magnetic particles according to the invention and the insulating magnetic materials manufactured therefrom exhibit high saturation magnetic flux density, high resistance, and high thermal stability, so that they are excellent in high-frequency magnetic characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An insulating magnetic metal particle, comprising:

a magnetic metal particle containing at least one metal selected from the group consisting of Co, Fe, and Ni and having a diameter of 5 to 500 nm;

a first inorganic insulating layer made of an oxide that covers the surface of the magnetic metal particle; and a second inorganic insulating layer made of an oxide that produces a eutectic crystal by reacting together with the first inorganic insulating layer at the time of heating them, the second inorganic insulating layer being coated on the first inorganic insulating layer, wherein a thickness ratio of the second inorganic insulating layer with respect to the first inorganic insulating layer is set so that the first inorganic insulating layer remains on the surface of the magnetic metal particle after producing the eutectic crystal.

2. The insulating magnetic metal particle according to claim 1, wherein the magnetic metal particle has a diameter of 10 to 100 nm.

3. The insulating magnetic metal particle according to claim 1, wherein the magnetic metal particle has a diameter of 10 to 50 nm.

4. The insulating magnetic metal particle according to claim 1, wherein each of the first and second inorganic insulating layers has a resistivity of $1\times10^2$ Ω·cm or more at room temperature.

5. The insulating magnetic metal particle according to claim 1, wherein the first inorganic insulating layer is made of an oxide containing at least one selected from the group consisting of $CeO_2$, CoO, $Cr_2O_3$, MgO, $Al_2O_3$, $SnO_2$, $NiO_2$, GaO, $GeO_2$, $Li_2O$, $Y_2O_3$, $HfO_2$, $La_2O_3$, ZnO, $ZrO_2$, $WO_3$, $TiO_2$, $Sc_2O_3$, BaO, $Eu_2O_3$, $SiO_2$, $Cs_2O$, $MoO_3$, $Nb_2O_5$, $TeO_2$, $Bi_2O_3$, copper oxides, and iron oxides, and the second inorganic insulating layer is made of an oxide different from that of the first inorganic insulating layer and containing at least one selected from the group consisting of $B_2O_3$, $Bi_2O_3$, PbO, $V_2O_5$, $TeO_2$, $Na_2O$, $K_2O$, and $MoO_3$.

6. The insulating magnetic metal particle according to claim 1, wherein the first inorganic insulating layer is made of an oxide (A) while the second inorganic insulating layer is made of an oxide (B) in which a combination (B-A) of them is any one selected from $B_2O_3$—$Al_2O_3$, $B_2O_3$—$GeO_2$, $B_2O_3$—$SiO_2$, $B_2O_3$—$WO_3$, $B_2O_3$—$Cr_2O_3$, $B_2O_3$—$MoO_3$, $B_2O_3$—$Nb_2O_5$, $B_2O_3$—$Li_2O_3$, $B_2O_3$—BaO, $B_2O_3$—ZnO, $B_2O_3$—$La_2O_3$, $B_2O_3$—CoO, $B_2O_3$—$Cs_2O$, $B_2O_3$—$K_2O$, $K_2O$—$GeO_2$, $K_2O$—$SiO_2$, $K_2O$—$WO_3$, $K_2O$—$MoO_3$, $K_2O$—$Nb_2O_5$, $Na_2O$—$GeO_2$, $Na_2O$—$SiO_2$, $Na_2O$—$WO_3$, $Na_2O$—MoO, $Na_2O$—$Nb_2O_5$, $MoO_3$—$Cs_2O$, $MoO_3$—$Li_2O$, $MoO_3$—$WO_3$, $Cs_2O$—$SiO_2$, and $Cs_2O$—$Nb_2O_5$.

7. The insulating magnetic metal particle according to claim 6, wherein the combination B-A is $B_2O_3$—$SiO_2$, and a ratio t2/t1 of an average thickness t2 of the second inorganic insulating layer with respect to an average thickness t1 of the first inorganic insulating layer is 1.2 or less.

8. A method for manufacturing an insulating magnetic material, comprising:

forming a first inorganic insulating layer made of an oxide on the surface of a magnetic metal particle containing at least one metal selected from the group consisting of Co, Fe, and Ni and having a diameter of 5 to 500 nm;

forming a second inorganic insulating layer made of an oxide that produces a eutectic crystal by reacting together with the first inorganic insulating layer at the time of heating them on the first inorganic insulating layer thereby to produce an insulating magnetic metal particle, wherein a thickness ratio of the first and second inorganic insulating layers is set so that the first inorganic insulating layer remains on the surface of the magnetic metal particle after producing the eutectic crystal;

molding the insulating magnetic metal particles to form a molded body; and heating the molded body to produce the eutectic crystal by reacting between the first and second insulating layers, while the first inorganic insulating layer remains on the surface of the magnetic metal particle.

9. The method according to claim 8, wherein the magnetic metal particle has a diameter of 10 to 100 nm.

10. The method according to claim 8, wherein the magnetic metal particle has a diameter of 10 to 50 nm.

11. The method according to claim 8, wherein each of the first and second inorganic insulating layers has a resistivity of $1\times10^2$ Ω·cm or more at room temperature.

12. The method according to claim 8, wherein the first inorganic insulating layer is made of an oxide containing at least one member selected from the group consisting of $CeO_2$, CoO, $Cr_2O_3$, MgO, $Al_2O_3$, $SnO_2$, $NiO_2$, GaO, $GeO_2$, $Li_2O$, $Y_2O_3$, $HfO_2$, $La_2O_3$, ZnO, $ZrO_2$, $WO_3$, $TiO_2$, $Sc_2O_3$, BaO, $Eu_2O_3$, $SiO_2$, $Cs_2O$, $MoO_3$, $Nb_2O_5$, $TeO_2$, $Bi_2O_3$, copper oxides, and iron oxides, and the second inorganic insulating layer is made of an oxide different from that of the first inorganic insulating layer and containing at least one member selected from the group consisting of $B_2O_3$, $Bi_2O_3$, PbO, $V_2O_5$, $TeO_2$, $Na_2O$, $K_2O$, and $MoO_3$.

13. The method according to claim 8, wherein the first inorganic insulating layer is made of an oxide (A) while the second inorganic insulating layer is prepared from an oxide (B) in which a combination (B-A) of them is any one selected from $B_2O_3$—$Al_2O_3$, $B_2O_3$—$GeO_2$, $B_2O_3$—$SiO_2$, $B_2O_3$—$WO_3$, $B_2O_3$—$Cr_2O_3$, $B_2O_3$—$MoO_3$, $B_2O_3$—$Nb_2O_5$, $B_2O_3$—$Li_2O_3$, $B_2O_3$—BaO, $B_2O_3$—ZnO, $B_2O_3$—$La_2O_3$, $B_2O_3$—CoO, $B_2O_3$—$Cs_2O$, $B_2O_3$—$K_2O$, $K_2O$—$GeO_2$, $K_2O$—$SiO_2$, $K_2O$—$WO_3$, $K_2O$—$MoO_3$, $K_2O$—$Nb_2O_5$, $Na_2O$—$GeO_2$, $Na_2O$—$SiO_2$, $Na_2O$—$WO_3$, $Na_2O$—MoO, $Na_2O$—$Nb_2O_5$, $MoO_3$—$Cs_2O$, $MoO_3$—$Li_2O$, $MoO_3$—$WO_3$, $Cs_2O$—$SiO_2$, and $Cs_2O$—$Nb_2O_5$.

14. The method according to claim 13, wherein the combination B-A is $B_2O_3$—$SiO_2$, and a ratio t2/t1 of a thickness t2 of the second inorganic insulating layer with respect to a thickness t1 of the first inorganic insulating layer is 1.2 or less.

15. The method according to claim 8, wherein the first inorganic insulating layer has an average thickness of 1 to 10 nm, while the second inorganic insulating layer has an average thickness of 1 to 5 nm.

16. The method according to claim 14, wherein an average thickness of the remaining first inorganic insulating layer is 1 to 5 nm.

17. The method according to claim 8, wherein a ratio t2/t1 of an average thickness t1 of the first inorganic insulating layer and an average thickness t2 of the second inorganic insulating layer is 0.1 to 2.

18. The method according to claim 8, wherein the magnetic metal particles covered with the remaining first inorganic insulating layer are dispersed into an insulating matrix made of the eutectic crystals at intervals of 0 to 10 nm.

19. The method according to claim 8, wherein a compound containing at least one element selected from Fe, Co, and Ni is added in case of forming the insulating magnetic particles.

* * * * *